(12) United States Patent
Nakada

(10) Patent No.: US 11,665,303 B2
(45) Date of Patent: May 30, 2023

(54) IMAGE PROCESSING APPARATUS, METHOD, AND PRODUCT FOR INSPECTING A TARGET IMAGE BY CORRECTING A PARTIAL REGION ADJACENT ANOTHER PARTIAL REGION BASED ON DIFFERENCES BETWEEN A REFERENCE IMAGE AND THE TARGET IMAGE

(71) Applicant: CANON KABUSHIKI KAISHA, Tokyo (JP)

(72) Inventor: Yuichi Nakada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/751,365

(22) Filed: May 23, 2022

(65) Prior Publication Data

US 2022/0385787 A1 Dec. 1, 2022

(30) Foreign Application Priority Data

May 31, 2021 (JP) .............................. JP2021-091748
Mar. 8, 2022 (JP) .............................. JP2022-035636

(51) Int. Cl.
*H04N 1/409* (2006.01)
*H04N 1/00* (2006.01)

(52) U.S. Cl.
CPC ......... *H04N 1/409* (2013.01); *H04N 1/00015* (2013.01); *H04N 1/00037* (2013.01); *H04N 1/00068* (2013.01); *H04N 1/00076* (2013.01); *H04N 1/00087* (2013.01)

(58) Field of Classification Search
None
See application file for complete search history.

(56) References Cited

U.S. PATENT DOCUMENTS 8,223,385 B2 * 7/2012 Minhas ................ H04N 1/6011
358/1.9
10,397,433 B2 * 8/2019 Oki ........................ H04N 1/047

FOREIGN PATENT DOCUMENTS

JP 2019158757 A 9/2019

* cited by examiner

*Primary Examiner* — Scott A Rogers
(74) *Attorney, Agent, or Firm* — Canon U.S.A., Inc. IP Division

(57) ABSTRACT

An image processing apparatus includes an acquisition unit configured to acquire first image data indicating a reference image as a target print result, and second image data indicating a target image to be inspected, and a processing unit configured to inspect the target image by performing a correction on a second partial region adjacent to a first partial region to enhance the second partial region relative to a difference image representing a difference between the reference image and the target image based on the first image data and the second image data, the first partial region having a difference in between the reference image and the target image.

16 Claims, 16 Drawing Sheets

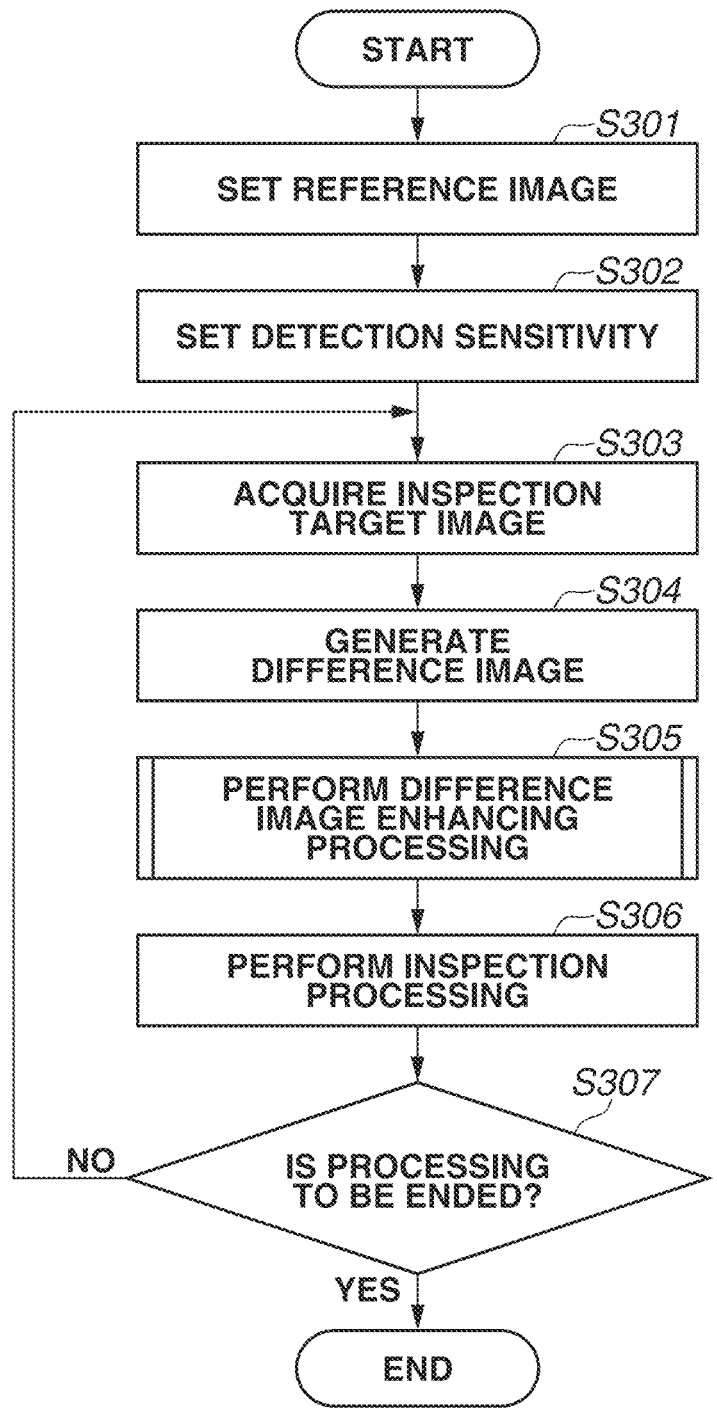

FIG.5A

| DETECTION SENSITIVITY | WIDTH OF VERTICAL-LINE DEFECT TO BE DETECTED |
|---|---|
| HIGH | 0.3 mm OR MORE |
| LOW | 0.5 mm OR MORE |

FIG.5B

|  | VERTICAL-LINE DEFECT |
|---|---|
| DETECTION SENSITIVITY | HIGH |

FIG.5C

|  | VERTICAL-LINE DEFECT |
|---|---|
| DETECTION SENSITIVITY | LOW |

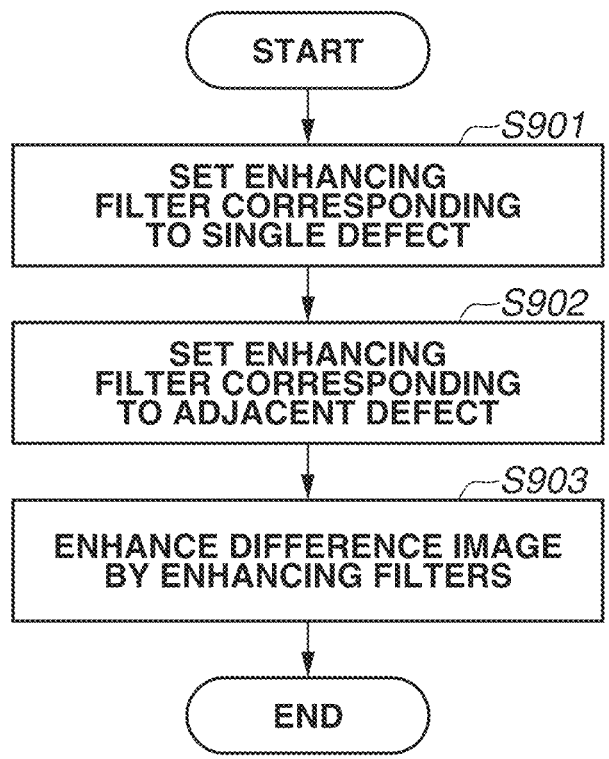

FIG.11A

| DETECTION SENSITIVITY | SIZE OF POINT DEFECT TO BE DETECTED | WIDTH OF VERTICAL-LINE AND HORIZONTAL-LINE DETECTS TO BE DETECTED |
|---|---|---|
| HIGH | 0.3 mm OR MORE | 0.3 mm OR MORE |
| LOW | 0.5 mm OR MORE | 0.5 mm OR MORE |

FIG.11B

|  | POINT DEFECT | VERTICAL-LINE DEFECT | HORIZONTAL-LINE DEFECT |
|---|---|---|---|
| DETECTION SENSITIVITY | HIGH | LOW | LOW |

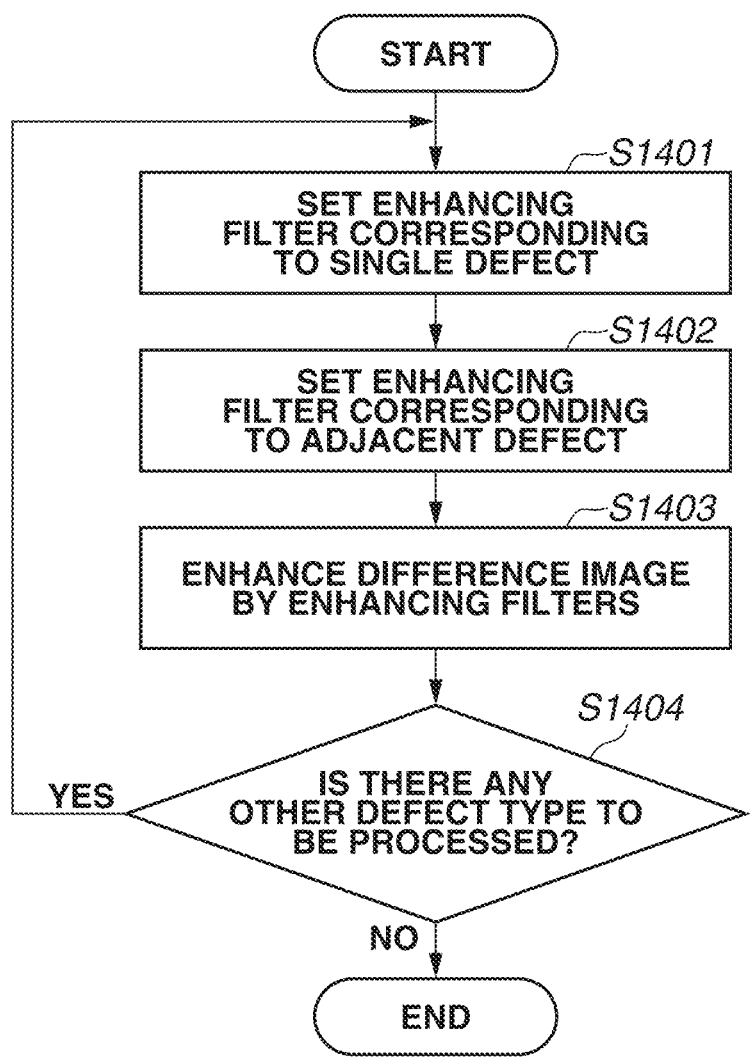

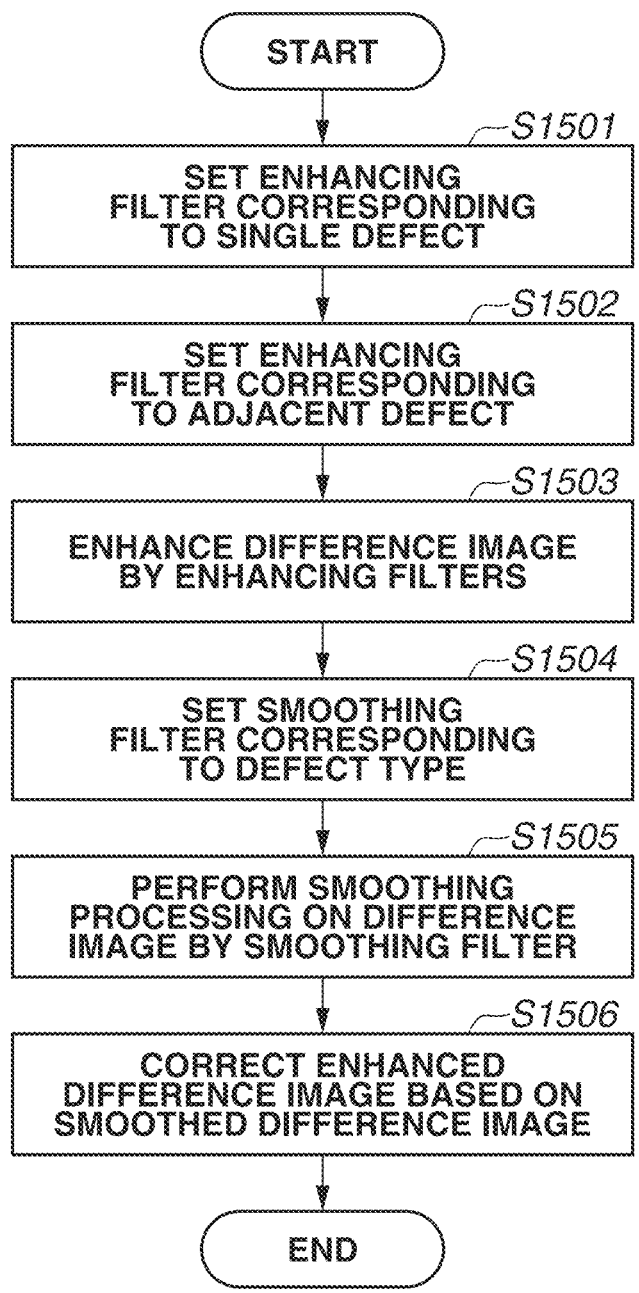

IMAGE PROCESSING APPARATUS, METHOD, AND PRODUCT FOR INSPECTING A TARGET IMAGE BY CORRECTING A PARTIAL REGION ADJACENT ANOTHER PARTIAL REGION BASED ON DIFFERENCES BETWEEN A REFERENCE IMAGE AND THE TARGET IMAGE

BACKGROUND

Field of the Disclosure

The present disclosure relates to an image processing technique for inspecting printed materials.

Description of the Related Art

There may be a demand for inspecting the presence or absence of a defect, such as contamination or color loss, on a printed material output from a printing apparatus, to thereby guarantee the quality of the printed material. Since the cost of visually inspecting the presence or absence of a defect on a printed material is high, automatic inspection systems have been developed. In such an inspection system, the presence or absence of a defect is determined based on a difference image representing a difference between a preliminarily registered reference image that is an inspection reference of a printed material and an inspection target image obtained by scanning an inspection target printed material. Japanese Patent Application Laid-Open No. 2019-158757 discusses a technique of determining the presence or absence of a defect on a printed material based on the magnitude of fluctuation of a pixel value in the difference image.

However, according to the technique discussed in Japanese Patent Application Laid-Open No. 2019-158757, the magnitude of fluctuation of a pixel value in the difference image is obtained using, for example, the difference between pixel values at a predetermined interval. Therefore, if defects are adjacent at the predetermined interval, the determination accuracy may be degraded.

SUMMARY

Accordingly, embodiments of the present disclosure are directed to providing a technique for accurately inspecting printed materials even when defects are adjacent to each other.

According to embodiments of the present disclosure, an image processing apparatus includes an acquisition unit configured to acquire first image data indicating a reference image as a target print result, and second image data indicating a target image to be inspected, and a processing unit configured to inspect the target image by performing a correction on a second partial region adjacent to a first partial region to enhance the second partial region relative to a difference image representing a difference between the reference image and the target image based on the first image data and the second image data, the first partial region having a difference in between the reference image and the target image.

Further features of the present disclosure will become apparent from the following description of exemplary embodiments with reference to the attached drawings.

BRIEF DESCRIPTION OF THE DRAWINGS

FIG. 3 is a flowchart illustrating processing to be executed by the image processing apparatus.

FIGS. 5A to 5C illustrate examples of detection sensitivities.

FIG. 9 is a flowchart illustrating processing for enhancing the difference image.

FIGS. 11A and 11B illustrate examples of detection sensitivities.

FIG. 14 is a flowchart illustrating processing for enhancing the difference image.

FIG. 15 is a flowchart illustrating processing for enhancing the difference image.

DESCRIPTION OF THE EMBODIMENTS

Exemplary embodiments of the present disclosure will be described below with reference to the drawings. The following exemplary embodiments do not necessarily limit the present disclosure. Not all combinations of features described in the exemplary embodiments are essential to the solution of the present disclosure.

In a first exemplary embodiment, a predetermined partial region corresponding to a defect (region that is different from a reference image, or is not included in the reference image) in a target image is enhanced relative to a difference image representing a difference between the reference image corresponding to a target print result and the target image to be inspected. Accordingly, a defect-enhanced image is generated by performing correction processing on the difference image so that the partial region is enhanced. A defect region is extracted based on this enhanced image and a printed material corresponding to the target image is inspected. Highlight processing uses an enhancing filter for performing image processing to enhance a partial region (first partial region) corresponding to a single defect, and an enhancing filter corresponding to an adjacent defect corresponding to a partial region (second partial region) that is adjacent to the first partial region in the target image. The difference image is enhanced so that the difference corresponding to the defects can be enhanced with these filters. In the present exemplary embodiment, inspection processing is performed based on the absolute value of the difference between the reference image and the target image. The above-described adjacent defect may be in contact with the first partial region, or may be located at a distance corresponding to a predetermined width, for example, the width of the first partial region.

<Configuration of Printing System>

Figure 1:
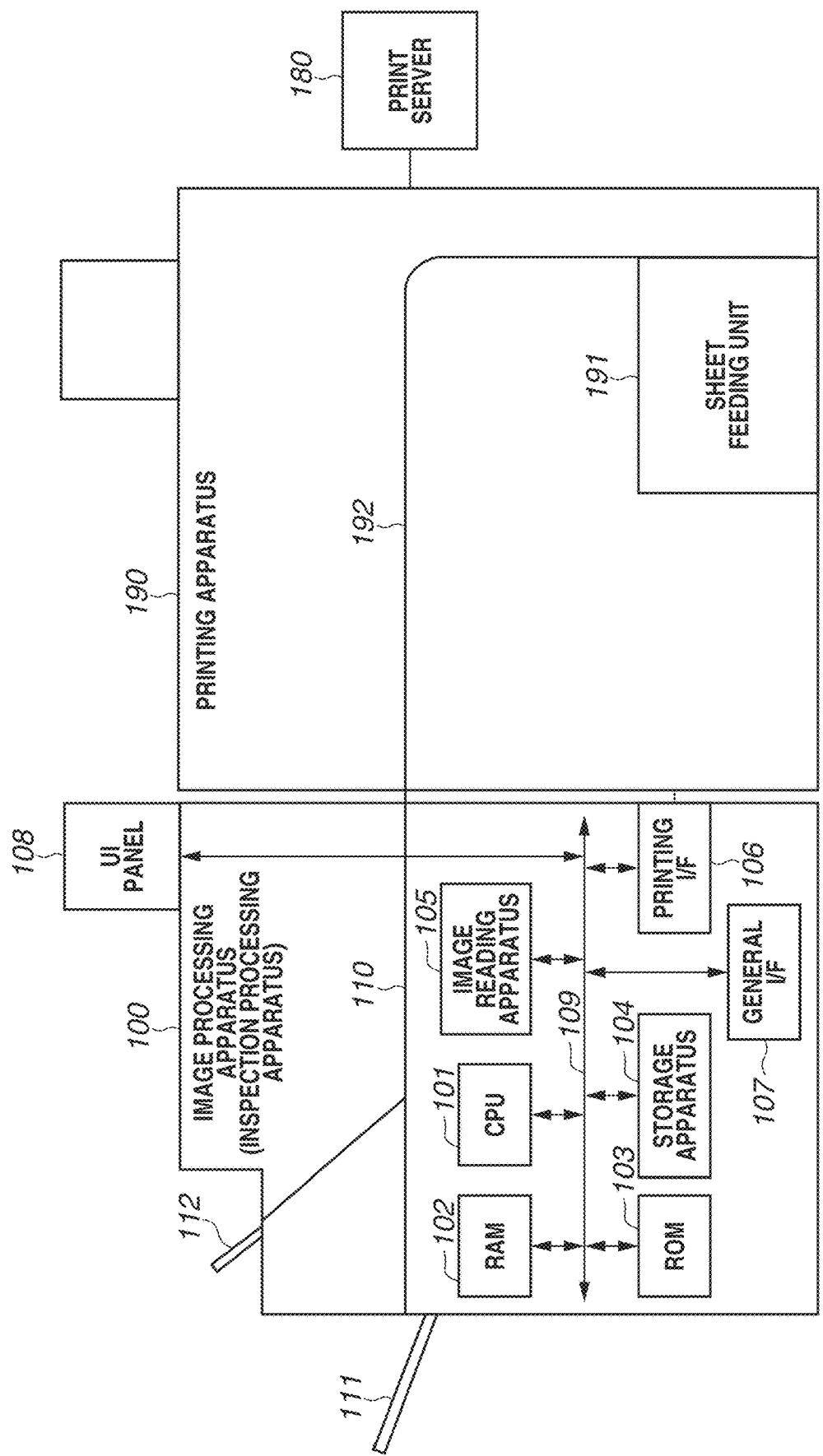
FIG. 1 illustrates a configuration example of a printing system including an image processing apparatus.

FIG. 1 illustrates an overall configuration example of a printing system that includes an image processing apparatus 100 and outputs and inspects printed materials. The printing system according to the present exemplary embodiment includes the image processing apparatus 100, a print server 180, and a printing apparatus 190. The print server 180 generates a print job for a document to be printed, and inputs the print job to the printing apparatus 190. The printing apparatus 190 forms an image on a recording medium (print sheet) based on the print job input from the print server 180. The printing apparatus 190 includes a sheet feeding unit 191. A user preliminarily sets a print sheet on the sheet feeding unit 191. When a print job is input, the printing apparatus 190 forms an image on the surface (one side or both sides) of the print sheet set on the sheet feeding unit 191, while conveying the print sheet along a conveyance path 192, and then delivers the print sheet to the image processing apparatus 100. The printing apparatus 190 according to the present exemplary embodiment is an electrophotographic printing apparatus, but instead may be an offset printing apparatus or an inkjet printing apparatus.

The image processing apparatus 100 inspects defects on an inspection target printed material on which printing has been performed.

The inspection target printed material obtained such that the printing apparatus 190 forms an image on a print sheet is conveyed along the conveyance path 192, and is inspected by the image processing apparatus 100. The image processing apparatus 100 functions as an inspection processing apparatus. The image processing apparatus 100 includes a central processing unit (CPU) 101, a random access memory (RAM) 102, and a read-only memory (ROM) 103. The image processing apparatus 100 also includes a storage apparatus 104, an image reading apparatus 105, a printing interface (I/F) 106, a general I/F 107, a user interface (UI) panel 108, and a main bus 109. The image processing apparatus 100 further includes a conveyance path 110, an output tray 111, and an output tray 112. The conveyance path 110 for printed materials is connected to the conveyance path 192 of the printing apparatus 190. Printed deliverables that have passed the inspection are output onto the output tray 111. Printed materials that have failed the inspection due to a detected defect are output onto the output tray 112. Instead of dividing the printed materials into the two categories, i.e., pass and fail, the printed materials can be divided into more categories. In the printing system, the storage apparatus 104, the image reading apparatus 105, the UI panel 108, the conveyance path 110, the output tray 111, and the output tray 112 may be provided outside the image processing apparatus 100.

The CPU 101 is a processor that comprehensively controls the components of the image processing apparatus 100. The RAM 102 functions as a main memory, a working area, or the like of the CPU 101. The ROM 103 stores programs to be executed by the CPU 101. The storage apparatus 104 stores applications to be executed by the CPU 101, data for use in image processing, and the like. The image reading apparatus 105 is a scanner, and reads one side or both sides of a printed material delivered from the printing apparatus 190 on the conveyance path 110 and acquires image data.

The printing I/F 106 is an interface that is connected to the printing apparatus 190 and is used to synchronize timings of processing printed materials between the image processing apparatus 100 and the printing apparatus 190 and to notify the image processing apparatus 100 and the printing apparatus 190 of the respective operation statuses. The general I/F 107 is a serial bus interface, such as a Universal Serial Bus (USB) interface or an Institute of Electrical and Electronics Engineers (IEEE) 1394 interface, and enables the user to carry data such as logs.

The UI panel 108 is a display apparatus, such as a liquid crystal display, and functions as a user interface that notifies the user of the current status and settings of the image processing apparatus 100. The UI panel 108 can include an input apparatus, such as a touch panel or buttons, and can receive instructions related to inspection processing and the like from the user. The input apparatus can be provided separately from the UI panel 108. Examples of the input apparatus include a mouse and a keyboard. The main bus 109 is a transmission path that connects the modules of the image processing apparatus 100.

While conveying the printed material delivered from the printing apparatus 190 along the conveyance path 110, the image processing apparatus 100 performs inspection processing to be described below based on image data on the printed material read by the image reading apparatus 105. If the printed material passes the inspection, the printed material is conveyed to the output tray 111 for "pass". If the printed material fails the inspection, the printed material is conveyed to the output tray 112 for "fail". Thus, only the printed materials that are confirmed to satisfy a certain quality level can be gathered together as deliverable printed materials on the output tray 111.

<Functional Configuration of Image Processing Apparatus>

Figure 2:
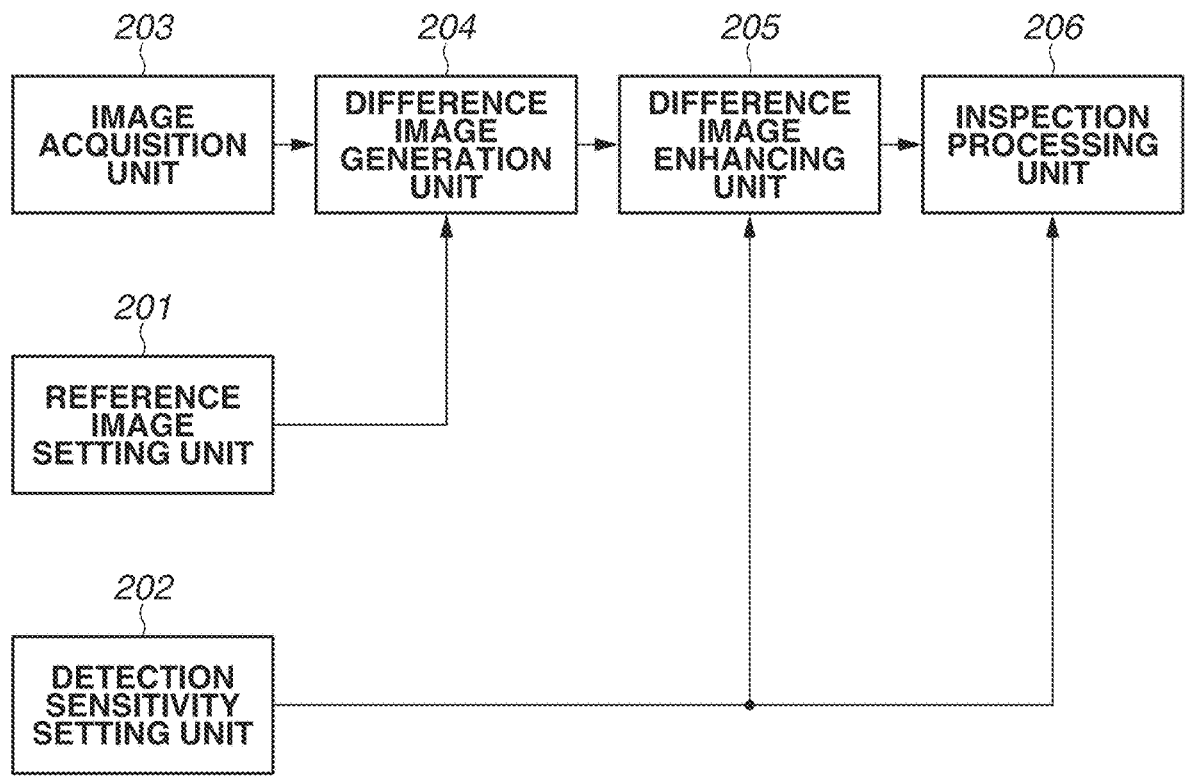
FIG. 2 is a block diagram illustrating a configuration example of the image processing apparatus.

FIG. 2 illustrates a functional configuration example of the image processing apparatus 100. The image processing apparatus 100 includes a reference image setting unit 201, a detection sensitivity setting unit 202, an image acquisition unit 203, a difference image generation unit 204, a difference image enhancing unit 205, and an inspection processing unit 206.

The reference image setting unit 201 sets an image indicated by image data recorded on the RAM 102 or the storage apparatus 104 as a reference image. The detection sensitivity setting unit 202 sets a detection sensitivity for each defect type based on an instruction received from the user through the UI panel 108. The image acquisition unit 203 acquires inspection target image data that indicates an inspection target image and is obtained such that the image reading apparatus 105 reads a printed material on the conveyance path 110. The acquired inspection target image data is held in the RAM 102 or the storage apparatus 104. The difference image generation unit 204 generates a difference image based on the reference image and the inspection target image. The difference image enhancing unit 205 generates a defect-enhanced image by enhancing the difference image using an enhancing filter corresponding to a single defect and an enhancing filter corresponding to adjacent defects that are set depending on the detection sensitivity. The inspection processing unit 206 performs inspection processing on the inspection target image based on the defect-enhanced image, and outputs the inspection result.

<Processing to Be Executed by Image Processing Apparatus>

FIG. 3 is a flowchart illustrating processing to be executed by the image processing apparatus 100. Each step (process) is represented by adding "S" before the reference numeral.

Figure 4A:
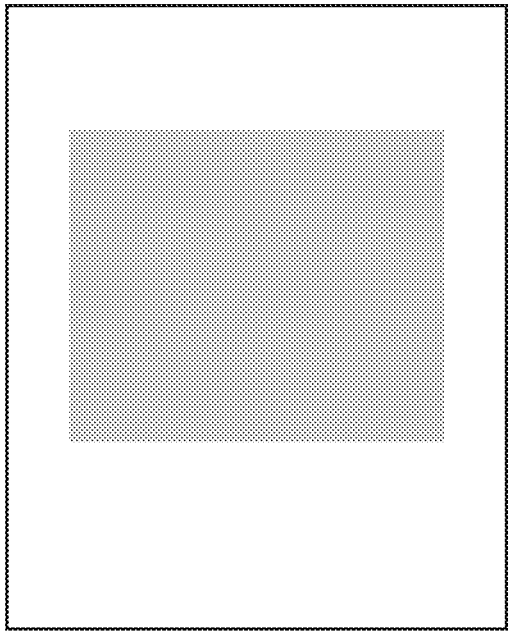
FIGS. 4A to 4C illustrate examples of a reference image and an inspection target image.

In step S301, the reference image setting unit 201 sets the reference image. FIG. 4A illustrates an example of the reference image. Reference image data (first image data) indicating the reference image is preliminarily created based on a scanned image obtained by scanning an image output from the printing apparatus 190, or by scanning a printed material printed by the printing apparatus 190, and the created reference image data is recorded on the RAM 102 or the storage apparatus 104.

In step S302, the detection sensitivity setting unit 202 sets a detection sensitivity for each defect type based on an instruction received from the user through the UI panel 108. In the present exemplary embodiment, only a defect in the shape of a vertical line (hereinafter also referred to as a vertical-line defect) is set as the defect type. The detection sensitivity setting unit 202 according to the present exemplary embodiment sets the detection sensitivity for the vertical-line defect in two levels of "high" and "low", and sets narrower vertical-line defects to be detected with the higher detection sensitivity. FIG. 5A illustrates an example of defects to be detected depending on the detection sensitivity. In the present exemplary embodiment, if the detection sensitivity is set to the high level (FIG. 5B), a vertical-line defect with a width of 0.3 mm or more is to be detected, and if the detection sensitivity is set to the low level (FIG. 5C), a vertical-line defect with a width of 0.5 mm or more is to be detected.

Figure 4B:
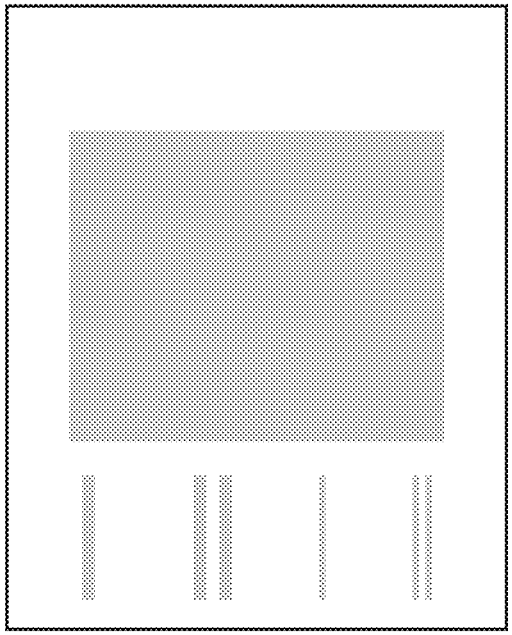

In step S303, the image acquisition unit 203 acquires inspection target image data (second image data) indicating the inspection target image. FIG. 4B illustrates an example of the inspection target image according to the present exemplary embodiment.

Assume that the inspection target image illustrated in FIG. 4B includes a vertical-line defect or a vertical-stripe defect.

Figure 6A:
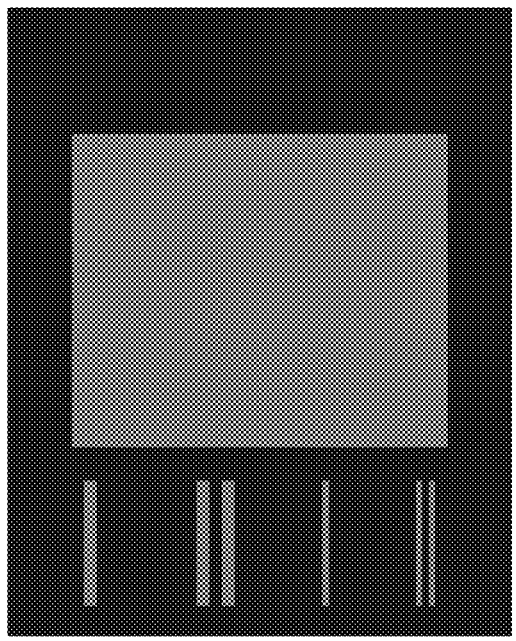
FIGS. 6A and 6B illustrate examples of a difference image.
Figure 6B:
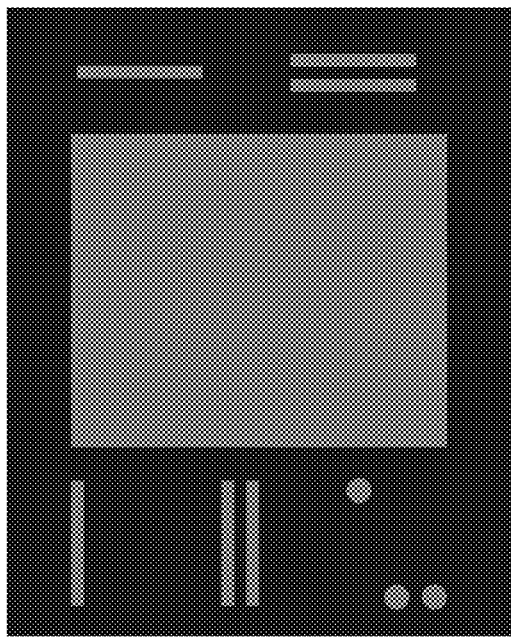

In step S304, the difference image generation unit 204 calculates an absolute value of a difference between luminance values of pixels corresponding to the reference image and the inspection target image based on the reference image and the inspection target image, and generates a difference image including the absolute value of the difference between the luminance values of the pixels. FIG. 6A illustrates an example of the difference image according to the present exemplary embodiment. As illustrated in FIGS. 6A and 6B, a partial region (first partial region) corresponding to a difference between the inspection target image and the reference image is represented by gray color, and a partial region with no difference is represented by black color.

Figure 7A:
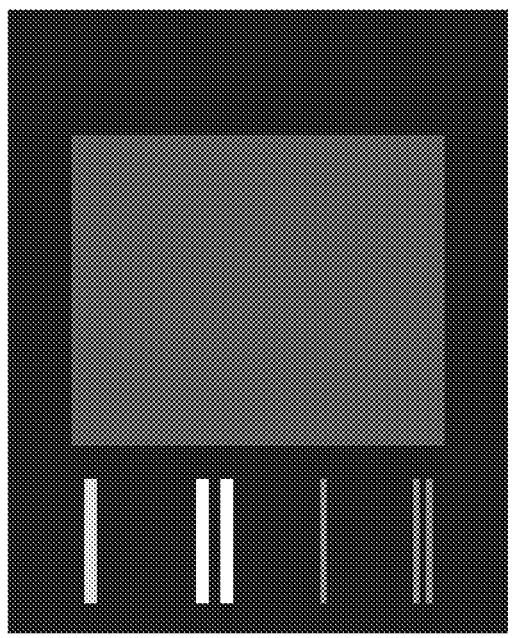
FIGS. 7A and 7B illustrate examples of a defect-enhanced image.
Figure 7B:
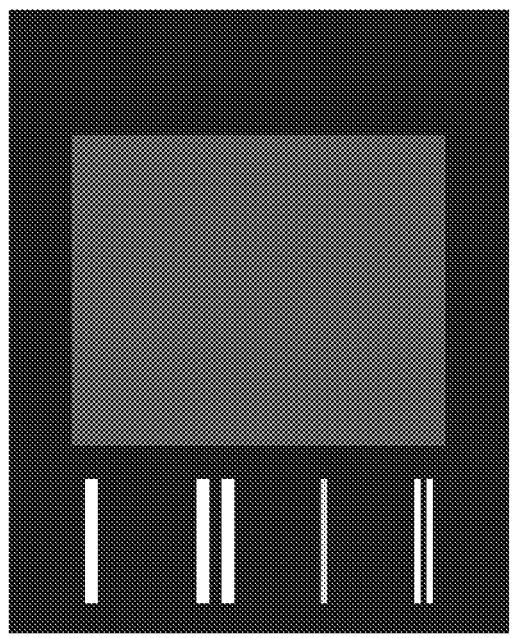

In step S305, the difference image enhancing unit 205 generates a defect-enhanced image by enhancing the difference image using an enhancing filter corresponding to a single defect and an enhancing filter corresponding to adjacent defects that are set based on the detection sensitivity. In enhancement processing, the difference region corresponding to the defects to be detected is enhanced. FIGS. 7A and 7B illustrate examples of the defect-enhanced image according to the present exemplary embodiment. In the difference image, a region with a greater difference is represented by a brighter color, and a region with a smaller difference is represented by a darker color. If the detection sensitivity is set to the low level, as illustrated in FIG. 7A, narrower vertical-line differences are not enhanced and only wider vertical-line differences are enhanced. If the detection sensitivity is set to the high level, not only narrower vertical-line differences, but also wider vertical-line differences are enhanced as illustrated in FIG. 7B. In the present exemplary embodiment, the difference corresponding to at least two vertical lines that are adjacent to each other is enhanced (i.e. highlighted) at a level equal to or higher than that corresponding to a single vertical-line defect that is not adjacent to another vertical-line defect. Difference image enhancement processing will be described in detail below.

Figure 8A:
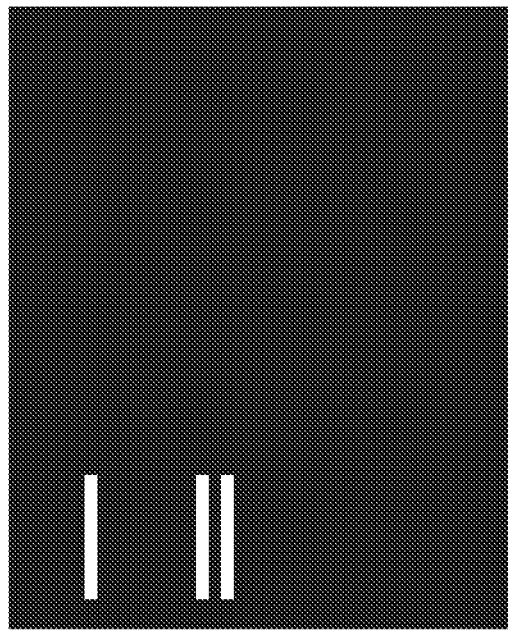
FIGS. 8A and 8B illustrate examples of a defect map.
Figure 8B:
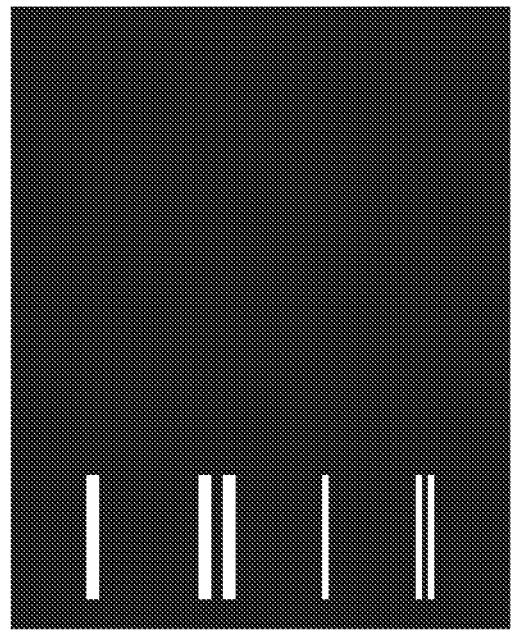

In step S306, the inspection processing unit 206 performs inspection processing based on the defect-enhanced image, and outputs the inspection result of the inspection target image. Specifically, a defect map is generated by extracting pixels having a pixel value greater than or equal to a preset threshold as defect regions in the defect-enhanced image. FIGS. 8A and 8B illustrate examples of the defect map according to the present exemplary embodiment. If the detection sensitivity is set to the low level, wider vertical-line differences are extracted as defect regions (white regions in FIGS. 8A and 8B) as illustrated in FIG. 8A. If the detection sensitivity is set to the high level, not only narrower vertical-line differences, but also wider vertical-line differences are extracted as defect regions as illustrated in FIG. 8B. If there is no defect region, the inspection result of the inspection target image indicates "pass", and if there is a defect region, the inspection result of the inspection target image indicates "fail".

In step S307, the inspection processing unit 206 determines whether processing is to be ended based on, for example, print information received from the printing apparatus 190, or an instruction received from the user through the UI panel 108. For example, if the inspection processing corresponding to the number of printed sheets or the number of sheets corresponding to user instructions is completed, the processing ends.

If it is determined that the processing is not to be ended (NO in step S307), the processing returns to step S303.

<Difference Image Enhancement Processing>

FIG. 9 is a flowchart illustrating processing for enhancing the difference image. In this processing, the defect-enhanced image is generated by performing a correction to perform highlight processing on the difference image using an enhancing filter corresponding to a single defect and an enhancing filter corresponding to adjacent defects that are set based on the detection sensitivity. As the enhancing filters, for example, a primary differential filter and a secondary differential filter can be used. In the present exemplary embodiment, a Laplacian of Gaussian (LoG) filter, which is one type of secondary differential filters, is used. Processing for enhancing the difference image will be described in detail below.

In step S901, the difference image enhancing unit 205 sets an enhancing filter f(x, σ1) corresponding to a single defect. Assuming that the line defect to be detected with the detection sensitivity set in step S302 has a width "a", a parameter σ1 is set based on the width "a". In the present exemplary embodiment, σ1 represents the half value of the width of the line defect to be detected as expressed by the following Expression (1).

$$\sigma_1 = \frac{a}{2} \tag{1}$$

The enhancing filter f(x, σ1) corresponding to a single defect is calculated according to Expression (2).

$$f(x, \sigma) = -\frac{x^2 - \sigma^2}{2\pi\sigma^6} \exp\left(-\frac{x^2}{2\sigma^2}\right) \tag{2}$$

Filter processing is applied to the difference image using the enhancing filter f(x, σ1) calculated as described above, thereby making it possible to enhance the difference corresponding to the line defect with the width "a".

However, if line defects with the width "a" are adjacent to each other, the difference corresponding to the adjacent line defects cannot be sufficiently enhanced using the enhancing filter f(x, σ1) in some cases. For this reason, an enhancing filter for enhancing the difference corresponding to adjacent line defects with the width "a" is set in the subsequent step.

In step S902, the difference image enhancing unit 205 sets an enhancing filter f(x, σ2) corresponding to the adjacent defects. First, a parameter σ2 is set according to Expression (3) based on the parameter σ1 for the enhancing filter corresponding to the single defect.

$$\sigma_2 = \alpha \sigma_1 \quad (3)$$

In Expression (3), α represents a value greater than "1". For example, it may be desirable that α=4. Then, an enhancing filter f(x, σ2) is calculated according to Expression (2). After that, the enhancing filter f(x, σ2) is calculated according to Expression (4).

$$f'(x, \sigma) = \frac{\sum_\Omega f(x, \sigma_1)}{\sum_\Omega f(x, \sigma)} f(x, \sigma) = \frac{1}{2 \sum_{x=-\lfloor \sigma_1 \rfloor}^{\lfloor \sigma_1 \rfloor} f(x, \sigma)} f(x, \sigma) \quad (4)$$

$$\Omega = \{x / f(x, \sigma_1) > 0\}$$

In Expression (4), the enhancing filter f(x, σ2) is calculated by correcting the enhancing filter f(x, σ2) such that the sum of coefficients of the enhancing filter is equal to the sum of coefficients of the enhancing filter f(x, σ1) in a positive range Ω. Filter processing is applied to the difference image using the enhancing filter f(x, σ2) calculated as described above, thereby making it possible to enhance the difference corresponding to the adjacent defects with the width "a". In the present exemplary embodiment, the value α is set such that the coefficients of the enhancing filter f(x, σ2) are included in the positive range and the coefficients of the enhancing filter f(x, σ1) are included in the negative range, thereby making it possible to enhance the adjacent defects, which cannot be sufficiently enhanced with the enhancing filter f(x, σ1), by using the enhancing filter f(x, σ2).

The coefficients of the enhancing filter f(x, σ1) need not necessarily be included in the negative range, and may be "0".

Further, if the positive range of the coefficients of the enhancing filter f'(x, σ2) is wider than the positive range of the coefficients of the enhancing filter f(x, σ1), the adjacent defects can be enhanced.

Figure 10A:
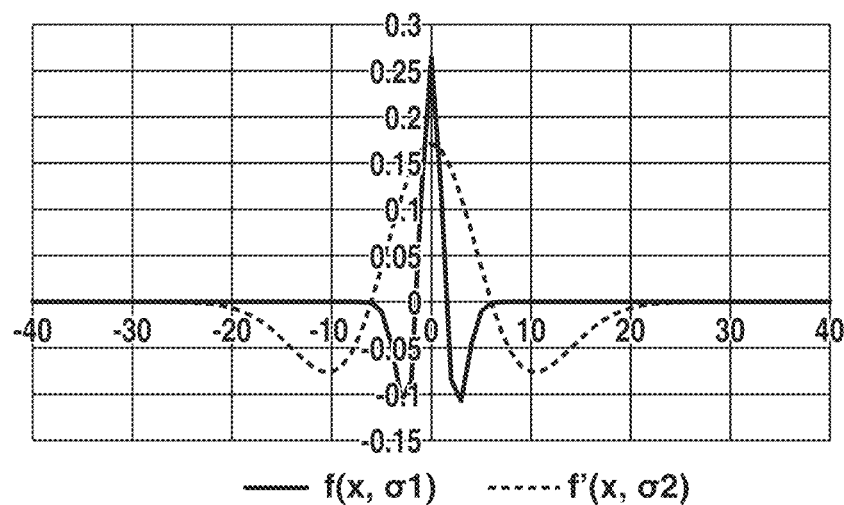
FIGS. 10A to 10C illustrate examples of an enhancing filter.
Figure 10B:
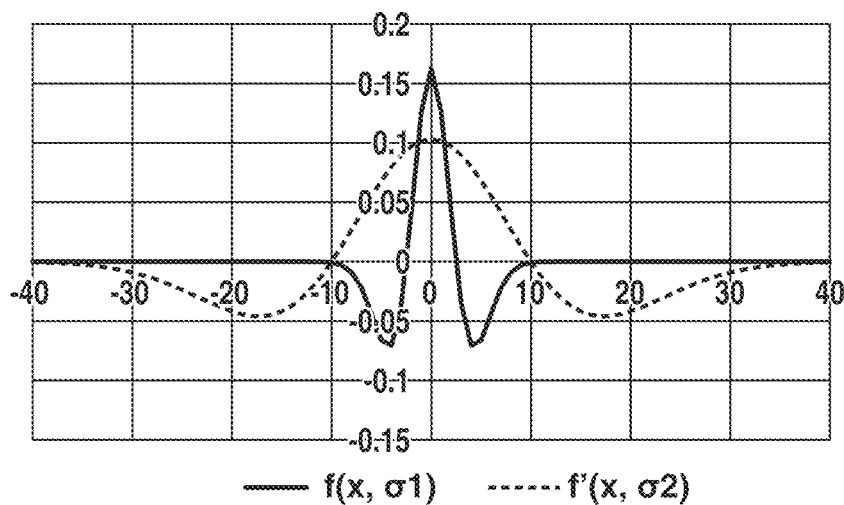

In the present exemplary embodiment, FIG. 10A illustrates examples of the enhancing filters when the detection sensitivity is set to the high level, and FIG. 10B illustrates examples of the enhancing filters when the detection sensitivity is set to the low level.

As narrower line defects are to be detected with the higher detection sensitivity, smaller enhancing filters are used.

In step S903, the difference image enhancing unit 205 enhances the difference image using the enhancing filter corresponding to the single defect and the enhancing filter corresponding to the adjacent defects, and generates the defect-enhanced image. In the present exemplary embodiment, a defect-enhanced image D' is calculated according to Expression (5).

$$D'(x, y) = \max(D'_1(x, y), D'_2(x, y))$$

$$D'_1(x, y) = D(x, y) * f(x, \sigma_1)$$

$$D'_2(x, y) = D(x, y) * f'(x, \sigma_2) \quad (5)$$

D'1 represents the result of enhancing a difference image D with the enhancing filter f(x, σ1) corresponding to the single defect, and the difference corresponding to the single defect is enhanced. D'2 represents the result of enhancing the difference image D with the enhancing filter f(x, σ2) corresponding to the adjacent defects, and the difference corresponding to the adjacent defects is enhanced. In the defect-enhanced image D', maximum values of D'1 and D'2 are used for each pixel, and the difference corresponding to a single defect and the difference corresponding to adjacent defects are enhanced.

<Advantageous Effects of First Exemplary Embodiment>

As described above, the image processing apparatus 100 according to the first exemplary embodiment sets a reference image as a target print result, sets a detection sensitivity for each defect type, acquires image data indicating an inspection target image, and generates a difference image representing a difference between the reference image and the inspection target image. Further, the image processing apparatus 100 enhances the difference image using an enhancing filter corresponding to a single defect and an enhancing filter corresponding to adjacent defects that are set based on the detection sensitivity, thereby generating a defect-enhanced image. Based on the detection sensitivity and the defect-enhanced image, the inspection target image is inspected. Consequently, adjacent defects can be enhanced at a level equal to or higher than a single defect. Therefore, it is possible to accurately perform inspection processing on printed materials even when defects are adjacent to each other.

Modified Examples

The detection sensitivity setting unit 202 according to the present exemplary embodiment sets the detection sensitivity in two levels. However, the method of setting the detection sensitivity is not limited to this method. For example, the detection sensitivity may be set in three or more levels. The detection sensitivity for a vertical-line defect may be fixed. The width of a vertical-line defect to be detected is not limited to the example illustrated in the present exemplary embodiment, as long as narrower vertical-line defects are to be detected with the higher detection sensitivity.

The difference image enhancing unit 205 according to the present exemplary embodiment sets a larger enhancing filter for a wider line defect to be detected in steps S901 and S902.

Figure 10C:
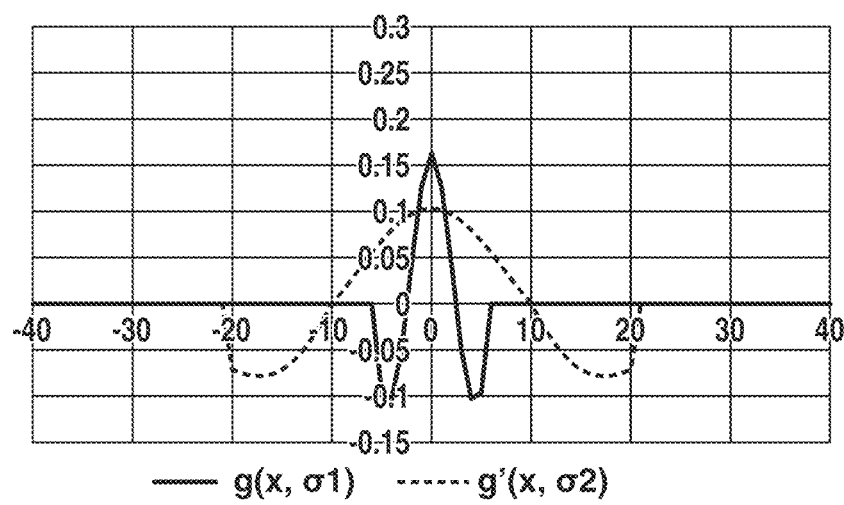

Alternatively, correction processing may be performed such that the enhancing filters have a size smaller than a predetermined size so as to prevent the enhancing filters from being excessively large. FIG. 10C illustrates an example of performing correction processing such that the enhancing filters have a size smaller than the predetermined size when the detection sensitivity is set to the low level. In this case, correction processing is performed by limiting negative coefficients included in the predetermined size with a threshold or the like so that the sum of the negative coefficients is equal to the sum of the positive coefficients. Limiting the correction processing makes it possible to reduce the size of each filter to be used, while enhancing a single defect and adjacent defects, which leads to a reduction in calculation cost.

The difference image enhancing unit 205 according to the present exemplary embodiment calculates and sets the enhancing filters in steps S901 and S902. Alternatively, the enhancing filters corresponding to the detection sensitivities may be calculated and recorded in advance and may be read out and set in steps S901 and S902.

The difference image enhancing unit 205 according to the present exemplary embodiment calculates and sets the two enhancing filters in steps S901 and S902, but instead may use three or more enhancing filters. For example, in the case of using three enhancing filters, σ3 may be set as a value greater than σ2, and an enhancing filter f(x, σ3) may be calculated according to Expression (2) and then an enhancing filter f(x, σ3) may be calculated according to Expression (4).

The difference image enhancing unit 205 according to the present exemplary embodiment sets the enhancing filters using horizontal secondary differential filters in steps S901 and S902. However, the difference image enhancing unit 205 may also use vertical smoothing filters as enhancing filters. Specifically, smoothing filters perpendicular to the enhancing filters are used. As the smoothing filters, averaging filters, Gaussian filters, and the like can be used. In this case, in step S903, the defect-enhanced image D' is calculated according to Expression (6).

$$D'(x, y) = \max(D'_1(x, y), D'_2(x, y))$$

$$D'_1(x, y) = D(x, y) * f(x, \sigma_1) * g(y)$$

$$D'_2(x, y) = D(x, y) * f(x, \sigma_2) * g(y) \qquad (6)$$

In Expression (6), g(y) represents a smoothing filter.

The difference image enhancing unit 205 according to the present exemplary embodiment uses maximum values of D'1 and D'2 for each pixel as the defect-enhanced image D' in step S903. However, the method of generating the defect-enhanced image is not limited to this method. For example, the defect-enhanced image D' may be calculated by taking the sum of D'1 and D'2 for each pixel according to Expression (7).

$$D'(x, y) = D'_1(x, y) + D'_2(x, y) \qquad (7)$$

The difference image enhancing unit 205 according to the present exemplary embodiment enhances adjacent defects at a level equal to or higher than a single defect in filter processing, but instead may enhance adjacent defects at a level equal to or higher than a single defect by a method other than filter processing. For example, pattern matching may be performed on each pixel of interest using a defect to be detected as a template, and the difference in the pixel of interest may be enhanced at a higher level as the number of similar differences to the defect to be detected in the vicinity region of the pixel of interest increases. More alternatively, correction processing may be performed to reduce the difference in the pixel of interest as the number of similar differences to the defect to be detected in the vicinity region of the pixel of interest decreases.

The inspection processing unit 206 according to the present exemplary embodiment extracts defect regions based on a preset threshold in the defect-enhanced image, but instead may set the threshold depending on the detection sensitivity. Alternatively, smaller regions may be excluded from the extracted defect regions.

The inspection processing unit 206 according to the present exemplary embodiment may display the region that includes the above-described enhanced partial regions and is extracted as the defect region on the UI panel 108 to inform the user of the extracted region, or may transmit information about the extracted region to the print server 180 that is an external apparatus. In this case, the extracted region may be displayed as the above-descried difference image or defect map. In the case of displaying the extracted region, adjacent regions may be enhanced relative to the difference image or the image of the defect map. Alternatively, the extracted region may be displayed such that the extracted region is surrounded with a frame in the target image.

The first exemplary embodiment illustrates an example where only the vertical-line defect is used as the defect type. In a second exemplary embodiment, three defect types, i.e., a dot-like defect (hereinafter referred to as a dot defect), a vertical-line defect, and a defect in the shape of a horizontal line (hereinafter referred to as a horizontal-line defect), are used. The configuration of the printing system and the functional configuration of the image processing apparatus 100 according to the second exemplary embodiment are similar to those of the first exemplary embodiment, and thus the descriptions thereof are omitted. In the second exemplary embodiment, the processes of steps S302, S305, and S306, which are different from the processes according to the first exemplary embodiment, will be mainly described below. Components of the second exemplary embodiment that are identical to those of the first exemplary embodiment are denoted by the same reference numerals.

In step S302, the detection sensitivity setting unit 202 sets a detection sensitivity for each defect type based on, for example, an instruction received from the user through the UI panel 108. In the present exemplary embodiment, three defect types, i.e., a dot defect, a vertical-line defect, and a horizontal-line defect, are used. The detection sensitivity setting unit 202 according to the present exemplary embodiment sets the detection sensitivity for each defect type in two levels of "high" and "low", and sets smaller dot defects and narrower line defects to be detected with the higher detection sensitivity. FIG. 11A illustrates examples of defects to be detected depending on the detection sensitivity. In the present exemplary embodiment, if the detection sensitivity is set to the high level, a dot defect with a size of 0.3 mm or more, or a line defect with a width of 0.3 mm or more is set as the detection target. If the detection sensitivity is set to the low level, a dot defect with a size of 0.5 mm or more, or a line defect with a width of 0.5 mm or more is set as the detection target. FIG. 11B illustrates a setting example of the detection sensitivity.

Figure 4C:
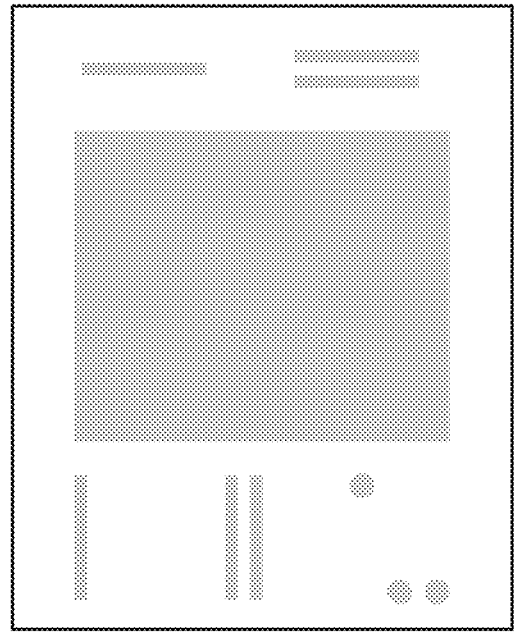
Figure 12A:
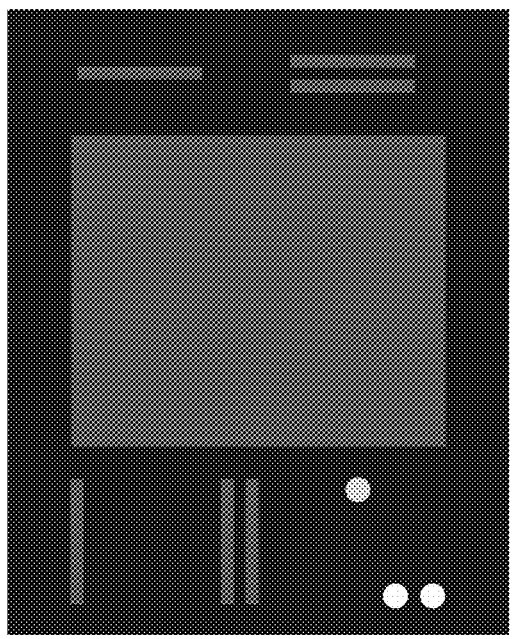
FIGS. 12A to 12C illustrate examples of the defect-enhanced image.
Figure 12B:
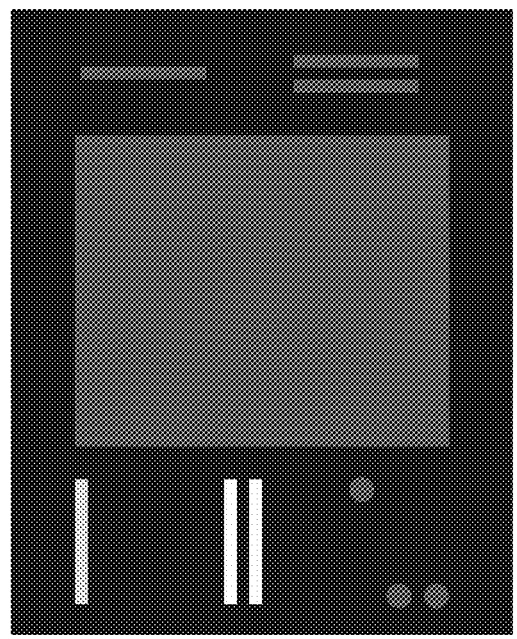
Figure 12C:
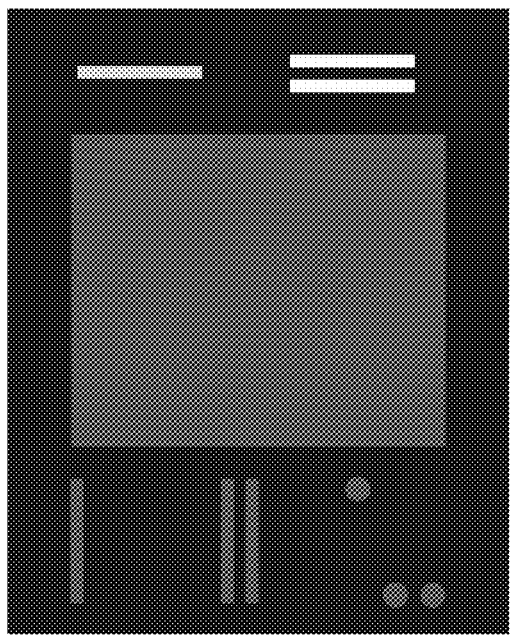

In step S305, the difference image enhancing unit 205 generates a defect-enhanced image by enhancing the difference image using an enhancing filter corresponding to a single defect and an enhancing filter corresponding to adjacent defects that are set based on the detection sensitivity for each defect type. In enhancement processing, the difference region corresponding to the defects to be detected for each defect type is enhanced. FIG. 4A illustrates an example of the reference image according to the present exemplary embodiment. FIG. 4C illustrates an example of the inspection target image according to the present exemplary embodiment. FIG. 6B illustrates an example of the difference image according to the present exemplary embodiment. Assume that the inspection target image according to the present exemplary embodiment includes a dot defect, a vertical-line defect, and a horizontal-line defect and the differences corresponding to the defects are present in the difference image. FIG. 12A illustrates an example of the defect-enhanced image corresponding to the dot defect according to the present exemplary embodiment. Only a single dot difference or adjacent dot differences are enhanced. FIG. 12B illustrates an example of the defect-enhanced image corresponding to the vertical-line defect according to the present exemplary embodiment. Only a single vertical-line difference or adjacent vertical-line differences are enhanced. FIG. 12C illustrates an example of the defect-enhanced image corresponding to the horizontal-line defect according to the present exemplary embodiment. Only a single horizontal-line difference or adjacent horizontal-line differences are enhanced. The difference image enhancement processing will be described in detail below.

Figure 13A:
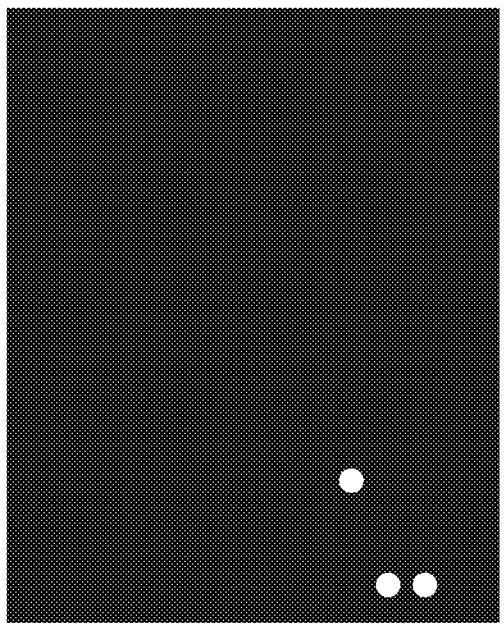
FIGS. 13A to 13C illustrate examples of the defect map.

In step S306, the inspection processing unit 206 performs inspection processing based on the defect-enhanced image corresponding to each defect type, and outputs the inspection result of the inspection target image. Specifically, a defect map is generated by extracting pixels having a pixel value greater than or equal to a preset threshold as defect regions in the defect-enhanced image corresponding to each defect type. FIG. 13A illustrates an example of the defect map corresponding to the dot defect according to the present exemplary embodiment. A single dot defect or adjacent dot defects are extracted as the defect region.

Figure 13B:
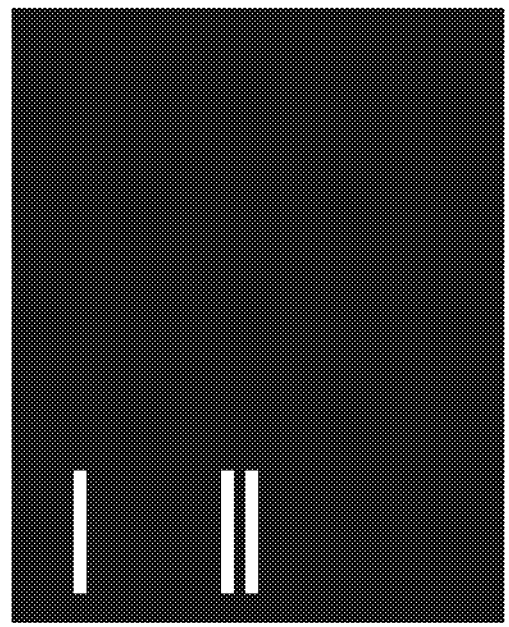
Figure 13C:
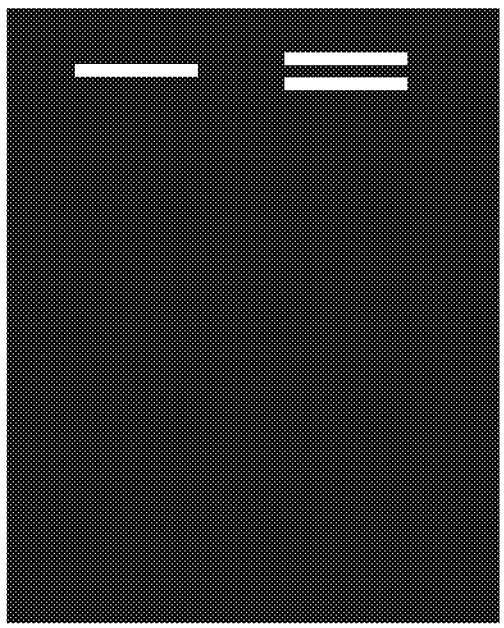

FIG. 13B illustrates an example of the defect map corresponding to the vertical-line defect according to the present exemplary embodiment. A single vertical-line defect or adjacent vertical-line defects are extracted as the defect region. FIG. 13C illustrates an example of the defect map corresponding to the horizontal-line defect according to the present exemplary embodiment. A single horizontal-line defect or adjacent horizontal-line defects are extracted as the defect region. If there is no defect region in the defect maps corresponding to all defect types, the inspection result of the inspection target image indicates "pass", and if there is a defect region in the defect map corresponding to any one of the defect types, the inspection result of the inspection target image indicates "fail".

<Difference Image Enhancement Processing>

FIG. 14 is a flowchart illustrating processing for enhancing the difference image according to the present exemplary embodiment.

In this processing, an enhancing filter corresponding to a single defect and an enhancing filter corresponding to adjacent defects that are set based on the detection sensitivity for each defect type are used. These filters are used to perform enhancement processing on the difference image, thereby generating the defect-enhanced image. In the present exemplary embodiment, three defect types, i.e., a dot defect, a vertical-line defect, and a horizontal-line defect, are used. If the vertical-line defect is set as the defect type, the processes of steps S1401 to S1403 are similar to the processes of steps S901 to S903, respectively, in the first exemplary embodiment, and thus the descriptions thereof are omitted. If the horizontal-line defect is set as the defect type, in steps S1401 and S1402, the enhancing filter corresponding to the horizontal-line defect is set by rotating the enhancing filter corresponding to the vertical-line defect described in the first exemplary embodiment by 90°. In step S1403, the defect-enhanced image is generated based on the enhancing filter corresponding to the horizontal-line defect. As a result, the difference corresponding to the horizontal-line defect can be enhanced. If the dot defect is set as the defect type, the defect-enhanced image can be generated using a two-dimensional primary differential filter, a two-dimensional secondary differential filter, or the like as an enhancing filter. In the present exemplary embodiment, a LoG filter is used. Processes to be executed when the dot detect is set as the defect type will be described below.

In step S1401, the difference image enhancing unit 205 sets an enhancing filter $f(x, y, \sigma1)$ corresponding to a single defect. First, the parameter $\sigma1$ is set according to Expression (1) based on the size "a" of the dot defect. As expressed by Expression (8), the enhancing filter $f(x, y, \sigma1)$ corresponding to the single defect is calculated.

$$f(x, y, \sigma) = -\frac{x^2 + y^2 - \sigma^2}{2\pi\sigma^6}\exp\left(-\frac{x^2 + y^2}{2\sigma^2}\right) \quad (8)$$

Filter processing is applied to the difference image using the enhancing filter $f(x, y, \sigma1)$ calculated as described above, thereby making it possible to enhance the difference corresponding to the dot defect with the size "a".

However, if dot defects with the size "a" are adjacent to each other, the difference corresponding to the adjacent dot defects cannot be sufficiently enhanced with the enhancing filter $f(x, y, \sigma1)$ in some cases. For this reason, an enhancing filter for enhancing the difference corresponding to the adjacent dot defects with the size "a" is set in the subsequent step.

In step S1402, the difference image enhancing unit 205 sets an enhancing filter $f(x, y, \sigma2)$ corresponding to adjacent defects. First, the parameter $\sigma2$ is set according to Expression (3) based on the parameter $\sigma1$ for the enhancing filter corresponding to the single defect. Then, an enhancing filter $f(x, y, \sigma2)$ is calculated according to Expression (8). After that, the enhancing filter $f(x, y, \sigma2)$ is calculated according to Expression (9).

$$f'(x, y, \sigma) = \frac{\sum_{\Omega}f(x, y, \sigma_1)}{\sum_{\Omega}f(x, y, \sigma)}f(x, y, \sigma) \quad (9)$$

$$\Omega = \{(x, y)/f(x, y, \sigma_1) > 0\}$$

In this case, the enhancing filter $f(x, y, \sigma2)$ is calculated by correcting the enhancing filter $f(x, y, \sigma2)$ such that the sum of coefficients of the enhancing filter is equal to the sum of coefficients of the enhancing filter $f(x, y, \sigma1)$ in the positive range $\Omega$. Filter processing is applied to the difference image using the enhancing filter $f(x, y, \sigma2)$ calculated as described above, thereby making it possible to enhance the difference corresponding to the adjacent dot defects with the size "a". In the present exemplary embodiment, the value $\alpha$ is set such that the coefficients of the enhancing filter $f(x, y, \sigma2)$ are included in the positive range and the coefficients of the enhancing filter $f(x, y, \sigma1)$ are included in the negative range, thereby making it possible to enhance the adjacent defects, which cannot be sufficiently enhanced with the enhancing filter $f(x, y, \sigma1)$, by using the enhancing filter $f'(x, y, \sigma2)$.

The coefficients of the enhancing filter $f(x, y, \sigma1)$ need not necessarily be included in the negative range, and may be "0". Further, if the positive range of the coefficients of the enhancing filter $f(x, y, \sigma2)$ is wider than the positive range of the coefficients of the enhancing filter $f(x, y, \sigma1)$, the adjacent defects can be enhanced.

In step S1403, the difference image enhancing unit 205 generates the defect-enhanced image by enhancing the difference image using the enhancing filter corresponding to the single defect and the enhancing filter corresponding to the adjacent defects. In the present exemplary embodiment, the defect-enhanced image D' is calculated according to Expression (10).

$$D'(x, y) = \max(D'_1(x, y), D'_2(x, y))$$

$$D'_1(x, y) = D(x, y)*f(x, y, \sigma_1)$$

$$D'_2(x, y) = D(x, y)*f(x, y, \sigma_2) \quad (10)$$

D'1 represents the result of enhancing the difference image D with the enhancing filter f(x, y, σ1) corresponding to the single defect, and the difference corresponding to the single defect is enhanced. D'2 represents the result of enhancing the difference image D with the enhancing filter f'(x, y, σ2) corresponding to the adjacent defects, and the difference corresponding to the adjacent defects is enhanced. In the defect enhanced image D', maximum values of D'1 and D'2 are used for each pixel, and the difference corresponding to a single defect and the difference corresponding to adjacent defects are enhanced. The above-described processing makes it possible to enhance adjacent defects at a level equal to or higher than a single defect even when the dot defect is set as the detection target. Consequently, it is possible to accurately inspect printed materials even when defects are adjacent to each other.

In step S1404, the difference image enhancing unit 205 determines whether there is any other defect type to be processed. If there is a defect type to be processed (YES in step S1404), the processing returns to step S1401. If all the defect types are already processed (NO in step S1404), the processing ends.

<Advantages Effects of Second Exemplary Embodiment>

As described above, the defect-enhanced image is generated by enhancing the difference image using an enhancing filter corresponding to a single defect and an enhancing filter corresponding to adjacent defects that are set based on the detection sensitivity for each defect type. Consequently, adjacent defects can be enhanced at a level equal to or higher than a single defect for each of different defect types. Therefore, it is possible to accurately inspect printed materials for each of different defect types even when defects are adjacent to each other.

The present exemplary embodiment uses three defect types, i.e., a dot defect, a vertical-line defect, and a horizontal-line defect. However, one or more of the defect types described above may be used, or defect types other than the above-described defect types may be added. For example, an oblique-line defect or the like may be added as a line defect that is inclined by a predetermined angle with respect to the vertical direction. In this case, the oblique-line defect can be enhanced by inclining the enhancing filter corresponding to the vertical-line defect by a predetermined angle and applying the inclined enhancing filter to the oblique-line defect.

In addition, a detection sensitivity for preventing a target defect type from being inspected may be provided. This makes it possible to select the defect type to be inspected based on the detection sensitivity.

In the present exemplary embodiment, the two-dimensional filter represented by Expression (8) is used as the enhancing filter corresponding to the dot defect. Alternatively, the two-dimensional filter can be approximated using a combination of one-dimensional filters. Specifically, at least one of the enhancing filter corresponding to a single defect and the enhancing filter corresponding to adjacent defects can be approximated using a plurality of one-dimensional Gaussian filters as the enhancing filter based on the LoG filter, for example, according to Expression (11).

$$f(x, y, \sigma) = -\frac{x^2+y^2-\sigma^2}{2\pi\sigma^6}\exp\left(-\frac{x^2+y^2}{2\sigma^2}\right) \cong G(x, y, \sigma^-) - G(x, y, \sigma^+) \quad (11)$$

$$G(x, y, \sigma) = \frac{1}{2\pi\sigma^2}\exp\left(-\frac{x^2+y^2}{2\sigma^2}\right) = G(x, \sigma) * G(y, \sigma)$$

-continued
$$G(x, \sigma) = \frac{1}{\sqrt{2\pi\sigma^2}}\exp\left(-\frac{x^2}{2\sigma^2}\right)$$

In Expression (11), $\sigma^-$ represents a value that is slightly smaller than $\sigma$, and $\sigma^+$ represents a value that is slightly greater than $\sigma$. The above-described approximation processing makes it possible to reduce the processing cost.

In the first exemplary embodiment, the difference image is enhanced using not only the enhancing filter corresponding to a single defect, but also the enhancing filter corresponding to adjacent defects. Accordingly, unlike in the case of enhancing the difference image using only the enhancing filter corresponding to a single defect, there is a possibility that differences corresponding to regions including no defect, such as regions in the vicinity of defects and regions including normal printing variations, such as small positional deviations, can be excessively enhanced, which may cause excessive detection. In a third exemplary embodiment, a difference image enhanced using the enhancing filter corresponding to a single defect and the enhancing filter corresponding to adjacent defects is corrected based on the difference image smoothed depending on the defect type. This correction processing prevents excessive enhancing of the difference. The configuration of the printing system and the configuration of the image processing apparatus 100 according to the third exemplary embodiment are similar to those of the first exemplary embodiment, and thus the descriptions thereof are omitted. In the third exemplary embodiment, the process of step S305, which is different from the process according to the first exemplary embodiment, will be mainly described below. Components of the third exemplary embodiment that are identical to those of the first exemplary embodiment are denoted by the same reference numerals.

FIG. 15 is a flowchart illustrating processing for enhancing the difference image according to the present exemplary embodiment. In this processing, the difference image enhanced with the enhancing filter corresponding to a single defect and the enhancing filter corresponding to adjacent defects is corrected based on the difference image smoothed depending on the defect type. The processes of steps S1501 to S1503 are similar to the processes of step S901 to S903, respectively, in the first exemplary embodiment, and thus the descriptions thereof are omitted.

In step S1504, a smoothing filter corresponding to a defect type is set. In the present exemplary embodiment, only the vertical-line defect is set as the defect type. In this case, a vertical smoothing filter is set as the smoothing filter corresponding to the vertical-line defect. As the smoothing filter, an averaging filter, a Gaussian filter, or the like can be used. The use of a smoothing filter with a shape that is similar to the shape of the defect type makes it possible to reduce effects due to noise.

In step S1505, the difference image is smoothed with the smoothing filter.

According to Expression (12), a smoothed difference image $D_s$ is calculated by applying a smoothing filter g(y) to the difference image D.

$$D_s(x,y)=D(x,y)*g(y) \quad (12)$$

In step S1506, the enhanced difference image is corrected based on the smoothed difference image. A corrected defect-enhanced image D" is calculated according to Expression (13) based on the defect-enhanced image D' and the smoothed difference image $D_s$.

$$D"(x,y)=k \cdot D_s(x,y) \cdot D'(x,y) \quad (13)$$

Figure 16A:
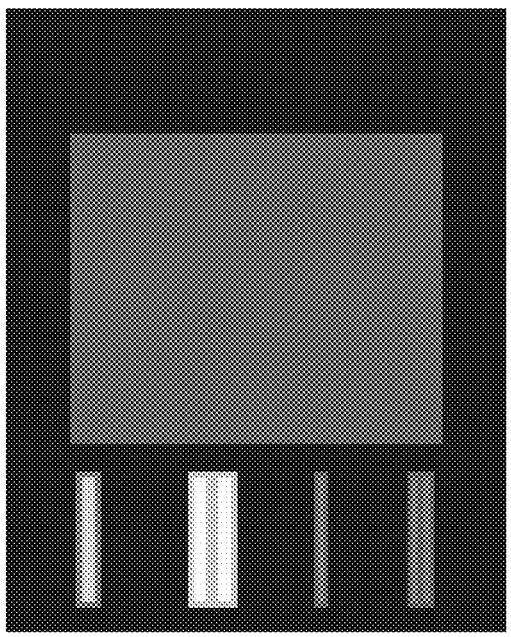
FIGS. 16A to 16C illustrate examples of the defect-enhanced image.
Figure 16B:
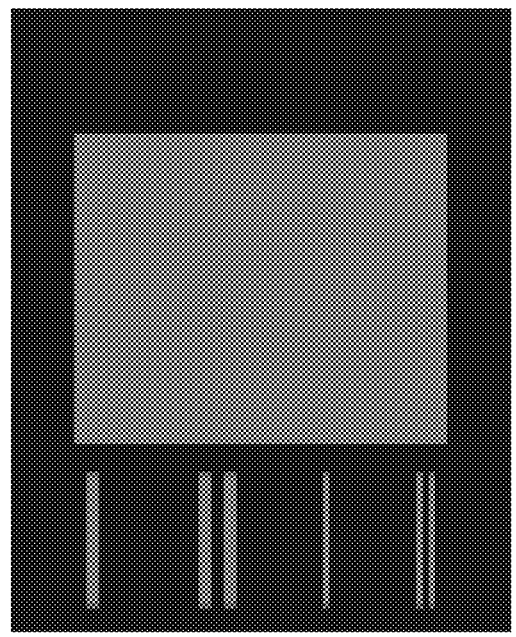
Figure 16C:
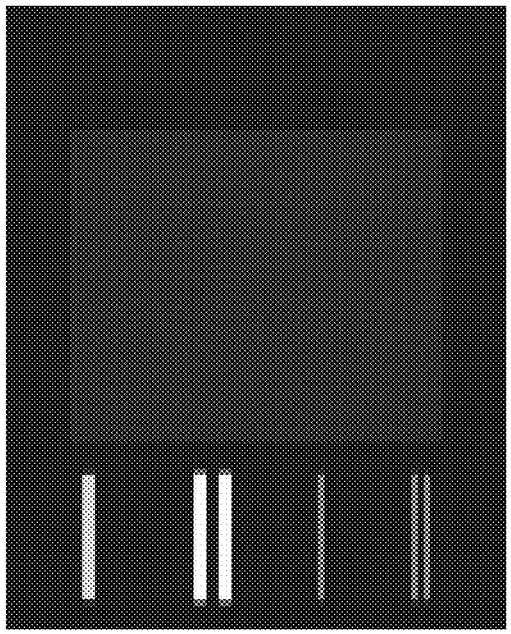

In Expression (13), k represents a constant for adjusting each pixel value of the corrected defect-enhanced image D″. For example, when a maximum pixel value or the like that can be taken by the smoothed difference image $D_s$ is set as "k", the pixel value of the corrected defect-enhanced image D″ can be made smaller than the pixel value of the defect-enhanced image D′. FIG. 6A illustrates an example of the difference image D according to the present exemplary embodiment. FIG. 16A illustrates an example of the defect-enhanced image D′. FIG. 16B illustrates an example of the smoothed difference image $D_s$. FIG. 16C illustrates an example of the corrected defect-enhanced image D″. These examples illustrate a case where the defect image in which the difference in the vicinity of a defect is corrected is acquired by correcting the defect-enhanced image in which the difference in the vicinity of the defect is excessively enhanced based on the smoothed difference image. In addition, it is possible to prevent excessive enhancing of differences generated in normal printed materials, such as differences generated in the vicinity of edges due to small positional deviations, differences generated due to variations in colors of printed materials, or differences generated due to noise during scanning.

<Advantageous Effects of Third Exemplary Embodiment>

As described above, the difference image enhanced with the enhancing filter corresponding to a single defect and the enhancing filter corresponding to adjacent detects is corrected based on the difference image smoothed depending on the defect type. Consequently, it is possible to prevent excessive enhancing of differences in regions including no defect. Therefore, it is possible to prevent excessive detection and accurately inspect printed materials.

While the present exemplary embodiment uses only the vertical-line defect as the defect type, any other defect types, such as a dot defect and a horizontal-line defect, may also be used. In this case, in step S1504, it may be desirable to set a smoothing filter with a shape similar to the shape of the defect type as the smoothing filter corresponding to the defect type. For example, in the case of setting the dot defect as the defect type, it may be desirable to set a circular smoothing filter. In the case of setting the horizontal-line defect as the defect type, it may be desirable to set a horizontally-long smoothing filter. Also, in the present exemplary embodiment, a plurality of defect types may be set, like in the second exemplary embodiment.

In the present exemplary embodiment, inspection processing is performed based on the corrected defect-enhanced image D″, but instead inspection processing may be performed based on the defect-enhanced image D′ and the smoothed difference image $D_s$. In this case, step S1506 is skipped and inspection processing is performed based on the defect-enhanced image D′ and the smoothed difference image $D_s$ in step S306. In the inspection processing, a defect map is generated by extracting, as defect regions, pixels having a pixel value that is greater than or equal to a threshold th0 preliminarily set in the defect-enhanced image D′ and is greater than or equal to a threshold th1 preliminarily set in the smoothed difference image $D_s$. The above-described processing makes it possible to prevent excessive detection of regions including no defect.

It is possible to accurately inspect printed materials even when defects are adjacent to each other.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2021-091748, filed May 31, 2021, and No. 2022-035636, filed Mar. 8, 2022, which are hereby incorporated by reference herein in their entirety.

What is claimed is:

1. An image processing apparatus comprising:
   one or more processors configured to: acquire first image data indicating a reference image as a target print result, and second image data indicating a target image to be inspected; and
   inspect the target image by performing a correction on a second partial region adjacent to a first partial region to enhance the second partial region relative to a difference image representing a difference between the reference image and the target image based on the first image data and the second image data, the first partial region having a difference in between the reference image and the target image.

2. The image processing apparatus according to claim 1, wherein the second partial region is in contact with the first partial region, or is located at a distance corresponding to a predetermined width from the first partial region.

3. The image processing apparatus according to claim 1, the one or more processors further configured to:
   set the reference image; and
   set a type of each of the first partial region and the second partial region,
   wherein the one or more processors perform correction to enhance the difference image depending on the type.

4. The image processing apparatus according to claim 3, wherein the one or more processors set sensitivities to detect the first partial region and the second partial region for the respective types, and wherein the one or more processors perform the correction on the smaller partial region for the type to which the higher sensitivity is set.

5. The image processing apparatus according to claim 3, wherein the one or more processors inspect the target image by correcting an enhanced difference image based on a smoothed difference image obtained by smoothing the difference image depending on the type, the enhanced difference image being enhanced relative to the difference image representing the difference between the reference image and the target image.

6. The image processing apparatus according to claim 3, wherein the one or more processors inspect the target image based on a smoothed difference image obtained by smoothing the difference image depending on the type and an enhanced difference image enhanced relative to the difference image representing the difference between the reference image and the target image.

7. The image processing apparatus according to claim 1, wherein in a case where the first partial region and the second partial region are at least two vertical-line partial regions, the one or more processors perform correction to enhance adjacent defects corresponding to the at least two vertical-line partial regions at a level equal to or higher than a single defect corresponding to a single vertical-line partial region.

8. The image processing apparatus according to claim 7, wherein the one or more processors perform the correction using a first enhancing filter corresponding to the single defect and a second enhancing filter corresponding to the adjacent defects, the level at which the adjacent defects is enhanced by the first enhancing filter being lower than the level at which the single defect is enhanced by the first enhancing filter.

9. The image processing apparatus according to claim 8, wherein the one or more processors perform the correction using a maximum value of a result of applying the first enhancing filter to the difference image and a maximum value of a result of applying the second enhancing filter to the difference image.

10. The image processing apparatus according to claim 8, wherein the one or more processors perform the correction using a sum of a result of applying the first enhancing filter to the difference image and a result of applying the second enhancing filter to the difference image.

11. The image processing apparatus according to claim 8, wherein the one or more processors correct the first enhancing filter and the second enhancing filter to have a size smaller than a predetermined value.

12. The image processing apparatus according to claim 8, wherein at least one of the first enhancing filter and the second enhancing filter is a one-dimensional filter.

13. The image processing apparatus according to claim 1, wherein the one or more processors perform an inspection by causing a display unit to display a region on which the correction has been performed.

14. The image processing apparatus according to claim 1, wherein the one or more processors perform an inspection by informing a user of a region on which the correction has been performed.

15. A non-transitory computer-readable storage medium storing a program for causing a computer to execute a method comprising:
   acquiring first image data indicating a reference image as a target print result and second image data indicating a target image to be inspected; and
   inspecting the target image by performing a correction on a second partial region adjacent to a first partial region to enhance the second partial region relative to a difference image representing a difference between the reference image and the target image based on the first image data and the second image data, the first partial region having a difference in between the reference image and the target image.

16. An image processing method comprising:
   acquiring first image data indicating a reference image as a target print result and second image data indicating a target image to be inspected; and
   inspecting the target image by performing a correction on a second partial region adjacent to a first partial region to enhance the second partial region relative to a difference image representing a difference between the reference image and the target image based on the first image data and the second image data, the first partial region having a difference in between the reference image and the target image.

* * * * *